US008977240B2

(12) United States Patent
Beckmann et al.

(10) Patent No.: US 8,977,240 B2
(45) Date of Patent: Mar. 10, 2015

(54) METHOD FOR THE CONTROL AND EVALUATION OF A MESSAGE TRAFFIC OF A COMMUNICATION UNIT BY MEANS OF A FIRST NETWORK UNIT WITHIN A MOBILE RADIO SYSTEM, PERTAINING COMMUNICATION UNIT AND FIRST NETWORK UNIT

(75) Inventors: Mark Beckmann, Braunschweig (DE); Michael Eckert, Braunschweig (DE); Martin Hans, Bad Saldetfurth/Heinde (DE)

(73) Assignee: Siemens Aktiengesellschaft, Munich (DE)

(*) Notice: Subject to any disclaimer, the term of this patent is extended or adjusted under 35 U.S.C. 154(b) by 1242 days.

(21) Appl. No.: 10/589,906

(22) PCT Filed: Jan. 18, 2005

(86) PCT No.: PCT/EP2005/050190
§ 371 (c)(1),
(2), (4) Date: Aug. 18, 2006

(87) PCT Pub. No.: WO2005/084058
PCT Pub. Date: Sep. 9, 2005

(65) Prior Publication Data
US 2007/0171851 A1    Jul. 26, 2007

(30) Foreign Application Priority Data
Feb. 26, 2004    (DE) .......................... 10 2004 009 289

(51) Int. Cl.
*H04M 1/725*    (2006.01)
*H04M 11/00*    (2006.01)
(Continued)

(52) U.S. Cl.
CPC ................ *H04W 8/08* (2013.01); *H04W 12/06* (2013.01); *H04W 24/08* (2013.01)
USPC ........ 455/412.2; 455/406; 455/445; 455/466; 455/560; 379/114.01; 379/221.14; 379/272

(58) Field of Classification Search
USPC .................. 370/338, 328, 351; 455/417, 466, 455/405–406, 410–412.2, 415, 445, 560; 379/114.01–133, 221.14, 272–273
See application file for complete search history.

(56) References Cited

U.S. PATENT DOCUMENTS

2002/0199095 A1* 12/2002 Bandini et al. ................ 713/151
2003/0109271 A1*  6/2003 Lewis et al. ................... 455/517
(Continued)

FOREIGN PATENT DOCUMENTS

WO    03/067907 A1    8/2003

OTHER PUBLICATIONS

3GPP TS 32.215 V5.4.0: $3^{rd}$ Generation Partnership Project; Technical Specification Group Services and System Aspects; Telecommunication Management; Charging Management; Charging Data Description for the Packet Switched (PS) domain (Release 5), Jun. 2003.

(Continued)

*Primary Examiner* — Michael Mapa
(74) *Attorney, Agent, or Firm* — Laurence A. Greenberg; Werner H. Stemer; Ralph E. Locher

(57) ABSTRACT

A method for controlling and evaluating message traffic of a communication unit uses a first network unit within a mobile radio system for forwarding all the messages of the message traffic. The first network unit decides, using one or more useful information items of the communication unit, whether one or more messages are forwarded to a second network unit for processing or whether they are blocked. The first network unit is also used to determine, using one or more useful information items of the communication unit, whether the respective message of the message traffic is logged by the first network unit in a logfile.

14 Claims, 6 Drawing Sheets

(51) Int. Cl.
*H04W 40/00* (2009.01)
*H04W 4/00* (2009.01)
*H04M 1/00* (2006.01)
*H04M 7/00* (2006.01)
*H04M 3/00* (2006.01)
*H04M 15/00* (2006.01)
*H04W 8/08* (2009.01)
*H04W 12/06* (2009.01)
*H04W 24/08* (2009.01)

(56) References Cited

U.S. PATENT DOCUMENTS

| | | | |
|---|---|---|---|
| 2004/0190696 A1* | 9/2004 | Fleischer et al. | 379/114.01 |
| 2004/0203432 A1* | 10/2004 | Patil et al. | 455/67.11 |
| 2004/0203589 A1* | 10/2004 | Wang et al. | 455/410 |
| 2005/0086519 A1 | 4/2005 | Meier et al. | |
| 2005/0114533 A1* | 5/2005 | Hullfish et al. | 709/230 |
| 2005/0186974 A1* | 8/2005 | Cai | 455/466 |

OTHER PUBLICATIONS

3GPP TS 22.115 5.4.0. (Jan. 2004): 3$^{rd}$ Generation Partnership Project; Technical Specification Group Services and System Aspects; Service Aspects; Charging and billing (Release 5), Jan. 2004.

Rosenberg, et al.: RFC 3261; SIP: Session Initiation Protocol, Network Working Group; Category: Standards Track; Jun. 2002.

S. Olson: A Mechanism for Content Indirection in SIP Messages draft-ietf-sip-content-indirect-mech-00; SIP—Internet draft, Aug. 12, 2002.

Niemi, et al.: RFC 3301, Hypertext Transfer Protocol (HTTP) Digest Authentication Using Authentication and Key Agreement (AKA), Sep. 2002.

3GPP TS 24.228 V5.2.0; 3$^{rd}$ Generation Partnership Project; Technical Specification Group Core Network; Signalling flows for the IP multimedia call control based on SIP and SDP; Stage 3 (Release 5), Sep. 2002.

3GPP TS 24.229 V5.2.0; 3$^{rd}$ Generation Partnership Project; Technical Specification Group Core Network; IP Multimedia Call Control Protocol based on SIP and SDP; Stage 3 (Release 5), Sep. 2002.

3GPP TS 23.060 V5.3.0; 3$^{rd}$ Generation Partnership Project; Technical Specification Group Services and System Aspects; General Packet Radio Service (GPRS); Service description; Stage 2 (Release 5), Sep. 2002.

Franks, et al.: RFC 2617: HTTP Authentication: Basic and Digest Access Authentication;; Network Working Group, Category: Standards Track; Jun. 1999.

Kent, et al.: RFC 2401: Security Architecture for the Internet Protocol; Network Working Group; Category: Standards Track; Nov. 1998.

Freed, et al.: RFC 2045; Multipurpose Internet Mail Extensions (MIME) Part One: Format of Internet Message Bodies; Network Working Group; Category: Standards Track; Nov. 1996.

\* cited by examiner

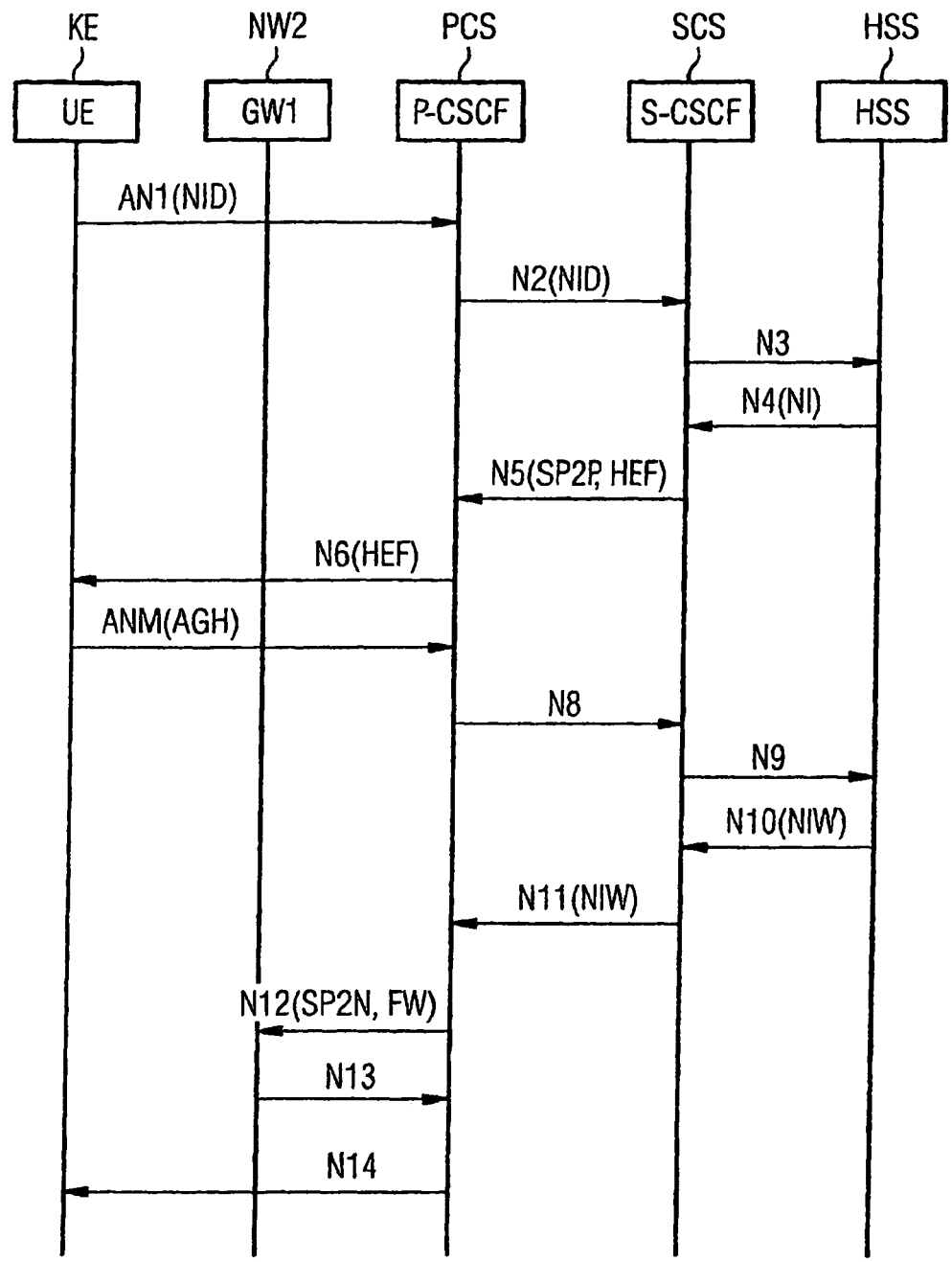

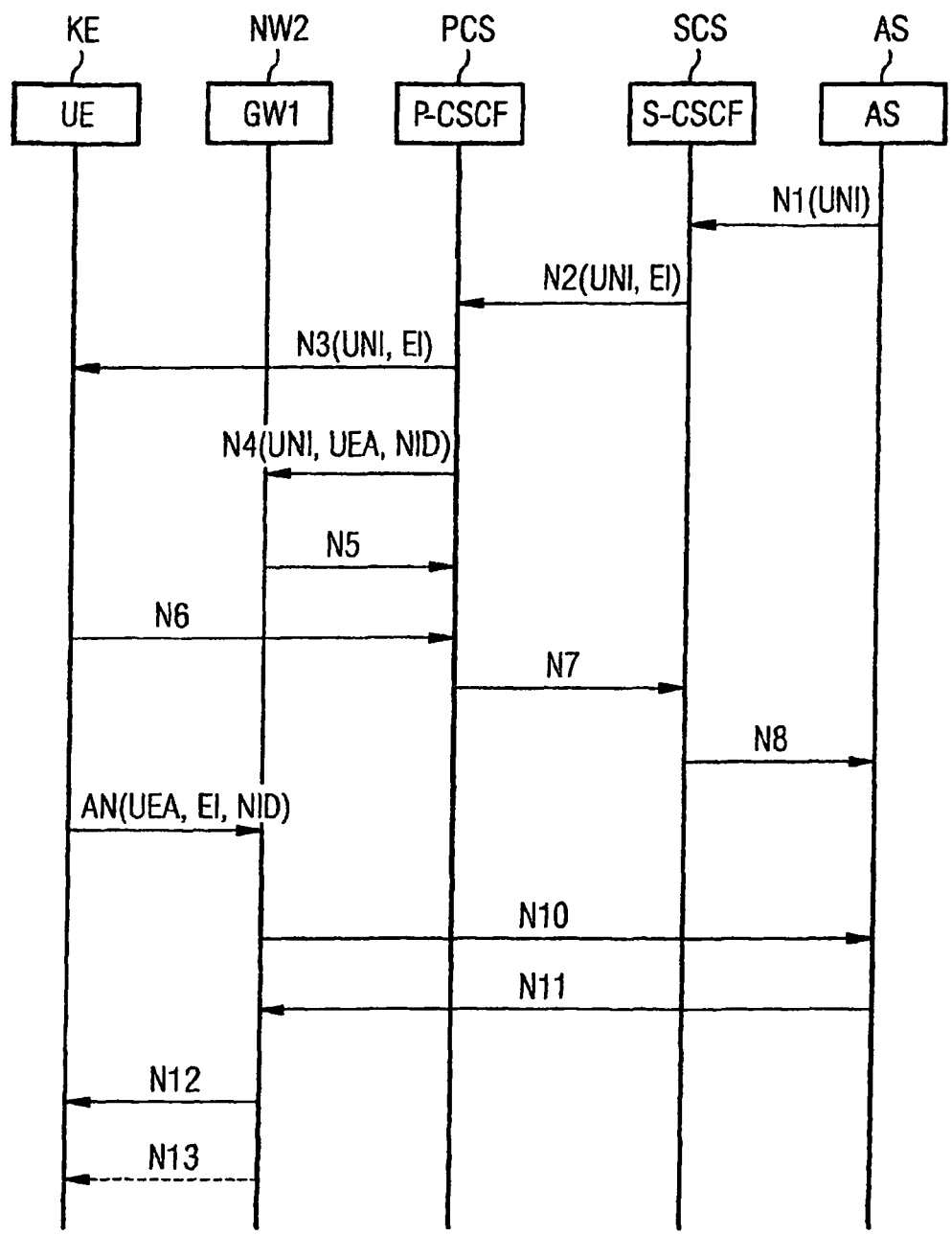

METHOD FOR THE CONTROL AND EVALUATION OF A MESSAGE TRAFFIC OF A COMMUNICATION UNIT BY MEANS OF A FIRST NETWORK UNIT WITHIN A MOBILE RADIO SYSTEM, PERTAINING COMMUNICATION UNIT AND FIRST NETWORK UNIT

Method for the control and evaluation of message traffic of a communication unit by means of a first network unit within a mobile radio system, pertaining communication unit and first network unit

SUMMARY OF THE INVENTION

The object of the invention is to provide the control and evaluation of the message traffic of a communication unit by means of a first network unit within a mobile radio system in a simple and efficient manner. This object is achieved by the following method in accordance with the invention.

Method for the control and evaluation of message traffic of a communication unit by means of a first network unit within a mobile radio system, in that all the messages of the message traffic are forwarded via the first network unit, in that by means of the first network unit a decision is made with the aid of one or more items of useful information from the communication network KE as to whether one or more messages are to be forwarded to a second network unit for further processing or are to be blocked, and in that a decision is made by means of the first network unit with the aid of one or more items of useful information from the communication unit as to whether the particular message of the message traffic is to be logged by the first network unit in a logfile.

By means of the method in accordance with the invention, the message traffic of a communication unit is controlled and evaluated in an advantageous manner. Using one or more items of useful information of the particular communication unit, different and individual decision rules for control and evaluation can be used for various communication units.

Furthermore, by means of the method in accordance with the invention the logging of the message traffic of an application of the particular communication unit is enabled in an advantageous manner. Because the logging takes place at application level, the logging can be made dependent on the content of the individual messages, i.e. on the message data. Thus, the data quantity of messages with multimedia content, such as video sequences or voice recordings, can be registered during the logging as a chargeable data volume, and messages with control information can be excluded from the logging.

The invention also relates to a first network unit for control and evaluation of message traffic of a communication unit within a mobile radio system, with a receiving unit by means of which all the messages of the message traffic of the communication unit can be received, with a transmitting unit by means of which all the messages of the message traffic can be transmitted, and with a processing unit by means of which it can be decided, on the basis of one or more items of useful information from the communication unit, whether at least one message of the message traffic is to be forwarded to a second network unit for further processing or is to be blocked, and by means of which it can be decided, on the basis of one or more items of useful information from the communication unit whether at least one message of the message traffic is to be logged in a logfile by the first network unit.

The invention also relates to a communication unit where the message traffic within a mobile radio system is controlled and evaluated by a first network unit, with a receiving unit by means of which all the messages of the message traffic can be received, and with a transmission unit by means of which all the messages of the message traffic can be transmitted.

Other developments of the invention are given in the subclaims.

The invention and its developments are explained in more detail in the following, with reference to drawings.

BRIEF DESCRIPTION OF THE DRAWINGS

The drawings are as follows:

FIG. 5 A flow diagram of possible message traffic for an example of an application in accordance with FIG. 4.

FIG. 7 A possible flow diagram of message traffic for a further example of an application with messages with SIP signaling and messages with useful data between a communication unit and network unit being associated.

DESCRIPTION OF THE PREFERRED EMBODIMENTS

1. First Exemplary Embodiment 1.1. Device

Figure 1:
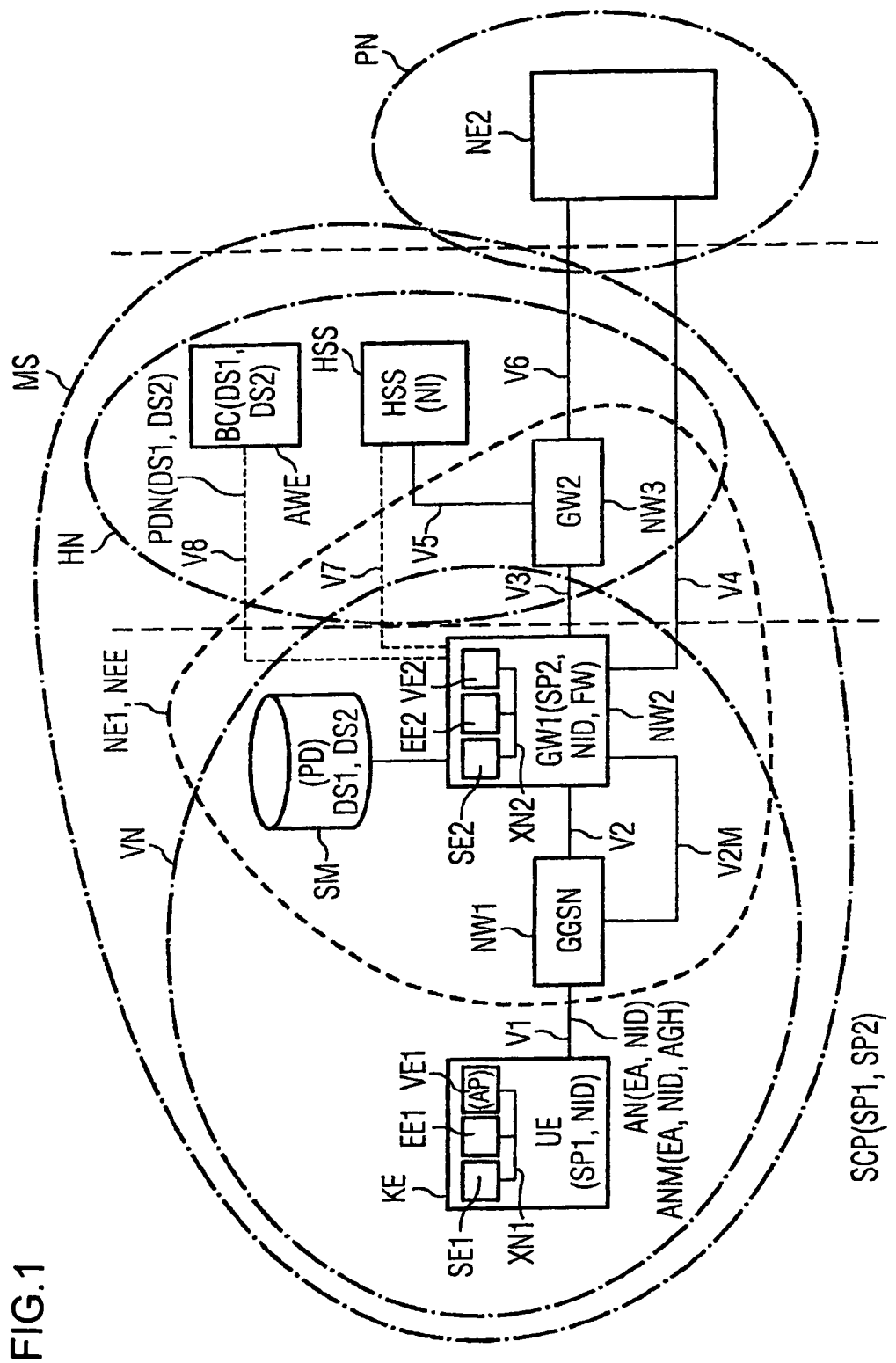
FIG. 1 A schematic drawing showing an arrangement for controlling and evaluating message traffic of a communication unit by means of a network unit that consists of a group of network elements within a mobile radio system, in accordance with a first variant of the method in accordance with the invention, including associated modifications, FIG. 2 A flow diagram of possible message traffic for an example of an application in accordance with FIG. 1, FIG. 3 A schematic representation of a possible construction of an item of called-up useful information with two user identities, FIG. 4 A schematic representation showing an arrangement for controlling and evaluating message traffic of a communication unit by means of a network unit, consisting of a group of network elements within a mobile radio system, using the IMS standard in accordance with another variant of the method in accordance with the invention, including associated modifications.

FIG. 1 shows a first possible device for implementation of the method in accordance with the invention. FIG. 1 shows a simplified representation of a possible network architecture. In the center of FIG. 1 is a home network HN (HN—Home Network) of a communication unit KE, that in FIG. 1 stays in a visited network VN (VN—Visited Network). This case is also generally known as "roaming". The home network HN and the visited network VN are located in a mobile radio system MS. The communication unit KE is, for example, mounted in a radio unit to the GSM standard (GSM—Global System for Mobile) or UMTS standard (UTMS—Universal Mobile Telecommunication System). This communication unit KE enables messages to be transmitted by means of a transmitting unit SE1 and also messages to be received by means of its receiving unit EE1. Furthermore, the communication device KE has a processing unit VE1, that permits the implementation, e.g. of an application AP. This application AP is especially a browser application or a push-to-talk application. The receiving unit EE1, the transmitting unit SE1 and the processing unit VE1 are connected by means of a connecting network XN1 and therefore able to exchange information.

The communication unit KE is connected in the visited network VN with a first network element NW1 through a first connection V1. This first network element NW1 is especially a GGSN (GGSN—Gateway GPRS Support Node)(GPRS—General Packet Radio System). This first connection V1 is established with the aid of the procedure called the PDP Context Activation Procedure (PDP—Packed Data Protocol), as described in 3GPP—3$^{rd}$ Generation Partnership Project) TS 23.060 Version 5.3.0 "General Packet Radio Service GPRS", Stage 2. During the establishment of this first connection V1, it is specified that this first connection V1 may be used only for the exchange of messages, for example messages with useful data ND, between the communication unit KE and the first network element NW1. Useful data ND is preferably understood to be data such as an image or a voice recording, but not signaling information. All messages with useful data ND transmitted on this first connection V1 are automatically forwarded from the first network element NW1 via a second connection V2 to a second network element NW2. The second network element NW2 is preferably a data gateway.

The second network element NW2 on the one hand has a fourth connection V4 in a public, packet-oriented network PN (PN—Public Network), such as the Internet. The public, packet-oriented network PN includes, for example, a second network unit NE2, such as a server with video sequences. On the other hand, there also exists a third connection V3 to a third network element NW3 that is located in the home network HN of the communication unit KE. The third network element NW3 is preferably a data gateway.

Furthermore, the third network element NW3 is networked with a database HSS, preferably a home subscriber service, through a fifth connection V5. This database HSS contains user-related information of the communication unit KE. Furthermore, the third network element NW3 is connected via a sixth connection V6 with the public packet-oriented network PN. In addition, the second network element NW2 in the visited network VN can be directly connected to the database HSS. This is shown in FIG. 1 by a dotted seventh connection V7.

A first network unit NE1 can consist of several network elements NEE. In FIG. 1 the first network element NE1 includes the first, second and third network elements NW1, NW2, NW3. In a case where the communication network KE is located in its home network HN, the second and third network element NW2 or NW3 can be located in a single network element that provides the functionalities of the second and third network elements NW2 or NW3. The first network element NE1 includes a transmitting unit SE2 for forwarding messages and a receiving unit EE2 for receiving messages. In addition, it contains a processing unit VE2 for controlling and evaluating data traffic of the application AP of the communication unit KE. The transmitting unit SE2, the receiving unit EE2 and the processing unit VE2 can exchange information through a connecting network XN2. In FIG. 1, each network element NEE contains its own transmitting unit, its own receiving unit, its own processing unit and its own connecting network. The example in FIG. 1 shows the transmitting unit SE2, the receiving unit EE2, the processing unit VE2 and the connecting network XN2 for the second network element NW2.

1.2 Request Message

In the following, the authentication of a communication unit is explained in more detail with the aid of FIG. 1. This authentication is necessary so that the second network element NW2 can determine whether a communication unit is actually that which it claims to be or whether this communication unit is authorized to exchange messages with the public packet-oriented network PN via the second network element NW2.

Figure 2:
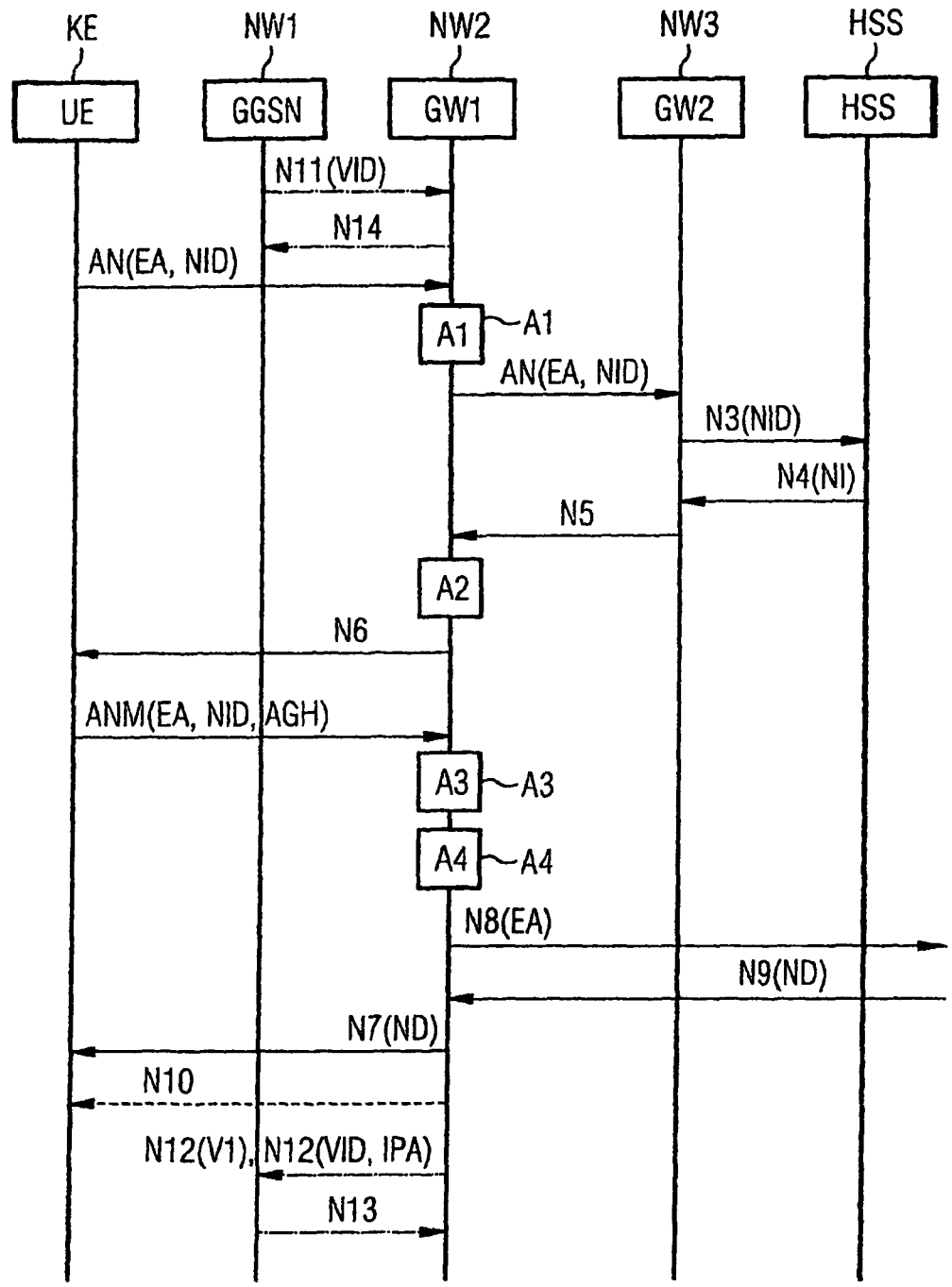

FIG. 2 shows a flow diagram of possible message traffic which is necessary for the authentication. In particular, this deals with the problem of message exchange between the communication unit KE and the public packet-oriented network PN.

If the communication unit KE requests messages, for example messages with useful data ND, from the public packed-oriented network PN or wishes to transmit messages to same, the communication unit KE sends a request message AN to the second network element NW2. In a case where the HTTP (Hyper Text Transfer Protocol) is used, this request message AN is an HTTP request. This request message AN contains a destination address EA from which useful data ND is requested and/or sent. The destination address EA can be in the form of a URI (Unique Resource Identifier). To authenticate the communication unit KE, a mechanism in accordance with the IETF (International Engineering Task Force) RFC (Request For Comments) 3310 "Hyper Text Transfer Protocol (HTTP) Digest Authentication Using Authentification and Key Agreement (AKA)", see www.ietf.org, can be used. For this purpose, an information line with the name "Authorization" is inserted into the request message AN. This mainly contains information regarding a user identity NID.

1.3 User Identity

A user identity NID provides a unique identification of a specific communication unit, e.g. the communication unit KE. By means of the information line with this user identity NID, the second network element NW2 can determine, in a first decision step A1, the network, e.g. the home network HN, to which the communication unit KE belongs. It is also determined whether the second network element NW2 has already stored one or more items of authentication information for the requesting communication unit KE. Because the second network element NW2 still has no authentication information of this kind, the second network element NW2 forwards the request message AN to the third network element NW3. It is assumed that the third connection V3 is protected and no third party is able to intercept, change or read messages.

1.4 Useful Information

In the following step, the third network element NW3 uses a third message N3 containing the user identity NID to request, from the database HSS, preferably the following useful information NI for the communication unit KE.

One or more second keys SP2 that are to be used for authentication and encoding of messages for the communication unit KE of the second network element NW2.

A challenge HEF that is to be used for authentication by the communication unit KE, e.g. refer to IETF RFC 3310.

One or more filter instructions FW.

In the following it is assumed that only a second key SP2 is requested from the database DB.

1.5 Filter Instruction

These filter instructions FW particularly include one or more of the following criteria:

One or more positive destination addresses PEA, that can be addressed by the communication unit KE.

One or more negative destination addresses NEA, that cannot be addressed by the communication unit KE One or more destination addresses XEA that are to be logged by the first network unit NE1. Logging by the second network element NW2 is shown in FIG. 1.

With the aid of these filter instructions FW, the second network element NW2 is enabled to limit access by the communication unit KE to one or more specific destination addresses EA in the public packed-oriented network PN. In addition, these filter instructions FW can also be used to inform the second network element NW2 to record accesses to certain destination address EA separately from other accesses. Because several user identities NID can be allocated to one communication unit KE, one or more filter instructions FW can be explicitly allocated to a specific user identity NID. It is thus appropriate if one user identity NID is allocated in each case to an application AP.

With the aid of a fourth message N4, this useful information NI is transmitted from the database HSS to the third network element NW3. The third network element NW3 subsequently transmits this useful information NI in a fifth message N5 to the second network element NW2. In a case where the HTTP protocol is used for this purpose, the useful information NI specified for the challenge HEF of the communication unit KE is inserted in an information line with the name "WWW-Authenticate", see IETF RFC 3310 and IETF RFC 2617 "HTTP Authentification: Basic and Digest Access Authentification". All second keys required for encoding, authentication and protection of integrity are dealt with in a similar manner. In addition, an expected answer AEH to the challenge HEF can be contained in this fifth message N5. This enables the second network element NW2 to check the response AGH sent by the communication unit KE in response to the challenge HEF against the expected answer AEH for correctness. In this case, it is not necessary to forward this response AGH to the third network element NW3 to check the authenticity.

One or more filter instructions FW can be contained in a new type of message body in this fifth message N5, that for example is formed as an HTTP message using the HTTP protocol. This new type of message body can be identified by means of a unique description. This is appropriate in practice because this unique description is contained in the actual HTTP message in an information line with the name "Content-Type", that, for example, is formed according to the IETF RFC 2045 standard "Multipurpose Internet Mail Extensions (MIME) Part One: Format of Internet Message Bodies". This enables the second network element NW2 to determine the content of the HTTP message just by using this unique description, for example to determine whether it contains filter instructions FW.

Figure 3:
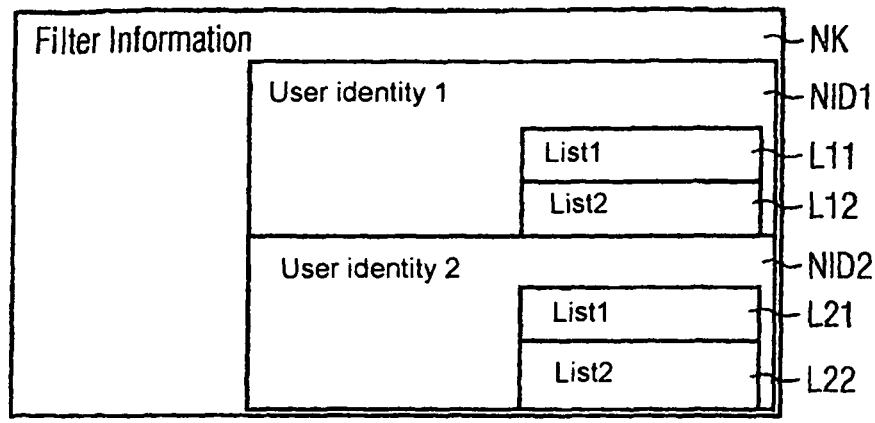

FIG. 3 is an example of the structure of several filter instructions FW contained in a message body NK. This message body NK has two lists L11, L12 or L21, L22 for each user identity NID1 or NID2 respectively. The first list L11 or L21 of the user identity NID1 or NID2 contains a list of the destination addresses XEA to be logged. The second list L12 or L22 of the relevant user identity NID1 or NID2 provides one or more negative destination addresses or NEA that cannot be addressed by the communication unit KE and/or one or more positive destination addresses PEA that can be addressed by the communication unit KE.

After receipt of the fifth message N5, the second network element NW2, in a second step A2, takes the second key SP2 from the information line with the name "WWW-Authenticate". Using the information line with the name "Content-Type", the second network element NW2 detects that one or more filter instructions FW are contained in the message body NK, and also takes these. The second network element NW2 then forwards this modified fifth message N5, as a sixth message N6, to the communication unit KE. Following this, the communication unit KE takes the challenge HEF from the information line with the name "WWW-Authenticate". With the aid of one or more of the items of information stored on a SIM (Subscriber Identification Model) card of the communication unit KE, a suitable first key SP1 is now calculated that can be used for the encoding of the messages between the communication unit KE and the second network element NW2, and also for authentication and protection of the integrity. The first key SP1 and the associated second key SP2 form a correlated key pair SCP. Furthermore, the communication unit KE calculates the response AGH to the challenge HEF by using the first key SP1.

1.6 Modified Request Message

In a next step, the communication unit KE sends a modified request message ANM to the second network element NW2. In a case where the HTTP syntax is used for the modified request message ANM, this modified request message ANM corresponds to an HTTP request. This modified request message ANM contains both the destination address EA from which the communication unit KE is to send useful data ND and also an information line with the name "Authorization". This information line also contains, in addition to the user identity NID, the response AGH to the challenge HEF.

After receipt of the modified request message ANM, the second network element NW2, in a third decision step A3, uses the user identity NID contained in the information line with the name "Authorization" to check whether the second network element NW2 has already stored authentication information for this communication unit KE. This is now given after the previous step of this exemplary embodiment has been completed. Accordingly, the second network element NW2 takes the information line with the name "Authorization" from the modified request message ANM. With the aid of the second key SP2 stored in the second network element NW2, the response AGH to the challenge HEF is checked for correctness in a next step. If the transmitted response AGH is not correct, the modified request message ANM is rejected by means of a tenth message N10. If the check shows correct agreement with the expected response AEH to the challenge HEF, then, in a fourth decision step A4, a check is carried out to determine whether the destination address EA contained in the modified request message ANM can be addressed by the communication unit KE. In a case where this destination address EA matches a negative destination address NEA, the modified request message ANM for transmission of useful data ND is rejected. This is notified to the communication unit KE by means of a tenth message N10. Alternatively, instead of the check of the destination address EA with the aid of at least one negative destination address NEA, the check can be carried out using at least one positive destination address PEA. In this case, a check is carried out to determine whether the destination address EA corresponds to a positive destination address PEA. If it does not, the modified request message ANM is rejected.

1.7 Logging

In the case where the destination address EA can be addressed, a check is also carried out to determine whether the destination address EA corresponds to one of the logging destination addresses XEA for which a second network element NW2 is to separately record the data quantity. If this is the case, a new first data record DS1 is created for the amount of data in the second network element NW2, that preferably should contain at least the following data record elements:

unique identity of the data record;
destination address EA accessed by the communication unit KE;
data quantity;
number of accesses to this destination address EA.

If the destination address EA corresponds to none of the logging destination addresses XEA, a new second data record DS2 for the data quantity is created, that preferably includes the following data record elements:
unique identity of the data record;
data quantity.

This second data record DS2 or the data record element with details of the data quantity is then always updated if one or more messages, possibly containing useful data ND, that according to the relevant filter instruction FW correspond to none of the logging destination addresses XEA, are exchanged between the communication unit KE and a destination address EA.

All first or second data records DS1 or DS2 are stored in a logfile PD on a storage element SM.

From the modified request message ANM, an eighth message N8 is then generated that is forwarded to a downstream second network unit NW2 or to a unit addressed by the destination address EA.

This second network unit NE2 is located in the public packet-oriented network PN. The answer to this eighth message N8, realized in FIG. 2 as the ninth message N9, is, after receipt by the second network element NW2, allocated to the corresponding data record DS1 or DS2 with which the modified request message ANM has already been logged. Following this, the second network element NW2 sends the ninth message N9 to the communication unit KE by means of a seventh message N7.

1.8 Evaluation of the Logfile

At a later timepoint, the second network element NW2 can forward the logfile PD via an eighth connection V8 to an evaluation unit AWE, for example a call-charging point, by means of a logging message PDN. This evaluation unit AWE evaluates one or more first or second data records DS1 or DS2 of the logfile PD, for example to generate a bill for the communication unit KE.

Furthermore, one or more first or second data records DS1 or DS2 for the volume of data can be evaluated by the evaluation unit AWE to enable control information to be generated for the optimization of data traffic within one or more networks, for example for the home network HN.

The use of filter instructions FW is advantageous in this respect because this contains billing depending upon the transmitted content, e.g. of useful data ND. Thus, accesses to a presence server can be separately recorded in that the address of the presence server is filtered. It is also advantageous in practice if the billing is not dependent on the low-level transport network, such as the GPRS. The generation of data records such as the first data record DS1 for recording the volume of data takes place merely in a network element of the data gateway type e.g. in the second network element NW2 in the exemplary embodiment shown here. A lower-level GPRS transport network will possibly offer the connection between the communication unit KE and the first network element NW1 that leads directly to the second network element NW2 free of charge. The billing then also takes place in the case of GPRS merely via the second and/or third network element NW2 or NE3. The GPRS transport network is thus not required to provide a billing function.

1.9 Expansions and Variations

A possible expansion of the exemplary embodiment is explained in more detail with the aid of FIG. 1 and FIG. 2. For this purpose, an additional modified second connection V2M is first inserted between the first network element NW1 and the second network element NW2 in the architecture of FIG. 1. This modified second connection V2M enables the second network element NW2 to notify the first network element NW1 if it is to disconnect the first connection V1 between the communication unit KE and the first network element NW1.

If, for example, the authentication of the communication unit KE fails, the second network element NW2 can then instruct the first network element NW1 to disconnect the first connection V1 and thus again release the radio resource occupied by this first connection V1. To do this, the second network element NW2, after transmitting the tenth message N10, transmits a twelfth message N12 to the first network element NW1 and thus requests the first network element NW1 to disconnect the first connection V1. The twelfth message N12 contains a unique identification of the connection to be disconnected, for example the first connection V1.

In accordance with an expansion of the method in accordance with the invention, the first network element NW1 allocates a connection identity VID at the start of the configuration of a new communication connection. The configuration of a communication connection in this case means the establishment of one or more connections between the particular network elements NEE and the communication unit KE, so that this communication unit KE can send one or more request messages AN to a second network unit NW2. Several communication connections can exist at the same time for one communication unit KE. For example for three different user identities NID of a communication unit KE three different communication connections exist at the same time. This connection identity VID uniquely identifies a connection between the first and second network element NW1 or NW2 of this new communication connection. The connection between the communication unit KE and the first network element NW1 is also uniquely identifiable with the aid of the IP (Internet Protocol) address, the communication unit KE and this connection identity VID.

The first network element NW1 forwards this connection identity VID, together with the IP address IPA of the communication unit KE in an eleventh message N11 to the second network element NW2. The second network element NW2 acknowledges the receipt of the eleventh message N11 by means of a fourteenth message N14.

This realization variant is advantageous because this merely requires a further signaling between the first and second network elements NW1 or NW2. The unique identification of this communication connection is thus known to the first and second network elements NW1 and NW2. This is useful in practice because one communication network KE can contain several communication connections to a first network element NW1 under the same IP address IPA. If the second network element NW2 gives the IP address IPA and the connection identity VID in the twelfth message N12, the first network element NW1 then clearly detects which communication connection or connection between the communication unit KE and the first network element NW1 is to be disconnected. The first network element NW1 acknowledges receipt of the twelfth message N12 by means of a thirteenth message N13.

The additional signaling with the eleventh and fourteenth messages N11 and N14 can also be used to send GPRS billing information to the second network element NW2. The second network element NW2 can add the GPRS billing information to one or more data records DS1 or DS2 of the second network element NW2 and forward this to the evaluation unit AWE. The evaluation unit AWE can correlate the data records DS1 or DS2 with the billing information of the GPRS transport network, for example with a billing function, and from this generate billing of the connection charges for the communication unit KE.

As an alternative to using a connection identity VID, an IPSec (Internet Protocol Security) Tunnel IIP can be used. For example, this can occur by means of the use of IPSec technology as in IETF RFC 2401, "Security Architecture for the Internet Protocol". This IPSec Tunnel IIP is assigned an identity. To disconnect the connection between the communication unit KE and the first network element NW1, the second network element NW2 merely transmits this identity of the IPSec Tunnel IIP to the first network element NW1. This identity is unambiguously known in both the first and second network elements NW1 and NW2. The first network element NW1 knows the map of the identity for the IPSec Tunnel IIP for the associated connection between the first network element NW1 and the communication unit KE.

For this solution, an IPSec Tunnel is provided between the first and second network elements NW1 and NW2 for each communication connection of a communication unit KE. This alternative is useful in practice because no additional signaling is required in order to communicate this identity of the IPSec Tunnel to the second network element NW2. The eleventh and fourteenth messages N11 and N14 are not required in this case.

After successful disconnection of the first connection V1 between the communication unit KE and the first network element NW1, that was initiated by the twelfth message N12 through the second network element NW2, the first network element NW1 sends a confirmation message N13 back to the second network element NW2.

2. Second Exemplary Embodiment

2.1 Device and Construction

Figure 4:
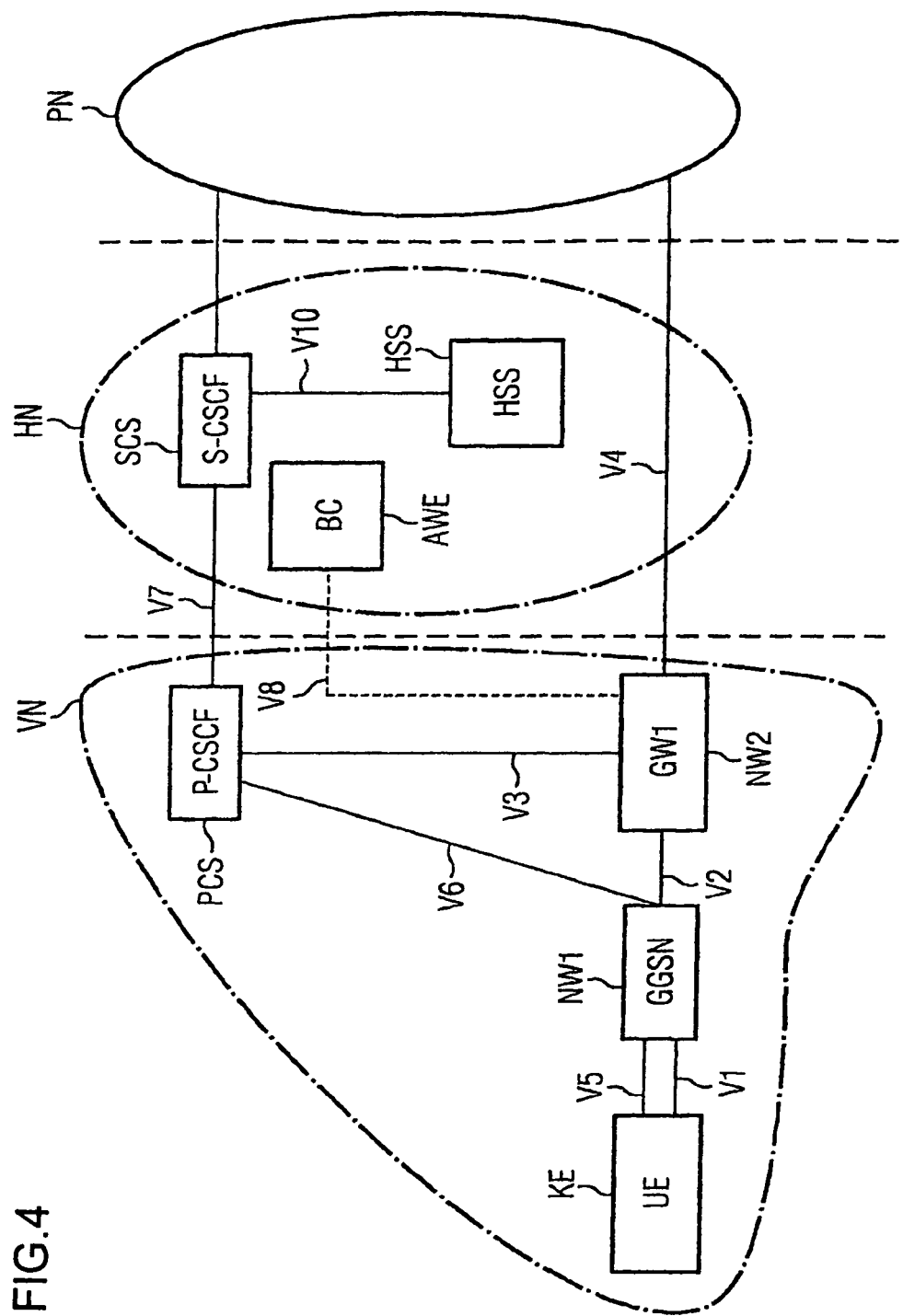

In a further exemplary embodiment, an alternative to authentication and protection of the integrity of a communication unit KE with the aid of a second network element NW2 is described. A second network element NW2 can be realized in the form of a data gateway. FIG. 4 shows a possible device for the implementation of this exemplary embodiment. The communication unit KE is located in a visited network VN. One or more messages can be formed with the aid of the SIP (Session Initiation Protocol) syntax, see IETF RFC 3261, "SIP Initiation Protocol".

The communication unit KE is connected with a first network element NW1 in the searched-for network VN via a first connection V1. This first connection V1 is established using a procedure called "PDP Context Activation Procedure", as described in 3GPP TS 23.06.0 version 5.3.0. This first connection V1 is thus realized with a first PDP context. During the establishment of this first connection V1, it is specified that this may be used only for the exchange of messages between the communication unit KE and the second network element NW2. All messages sent on this first connection V1 are automatically forwarded from the first network element NW1 via a second connection V2 to a second network element NW2. The second network element NW2 has a fourth connection V4 in a public packed-oriented network PN. In addition, the second network element NW2 has a third connection V3 to a SIP-proxy PCS. This SIP-proxy PSC is in this case always in the same network as the first network element NW1, i.e. in the visited network VN in this exemplary embodiment. Furthermore, with the aid of the procedure called "PDP Context Activation Procedure", a further connection called a fifth connection V5 is established between the communication unit KE and the first network element NW1. This fifth connection V5 is realized by means of a second PDP context. This fifth connection V5 is used mainly for the exchange of SIP messages. Furthermore, the first network element NW1 is connected via a sixth connection V6 to the SIP Proxy PCS, that additionally has a seventh connection V7 to the second SIP Proxy SCS. Via the fifth and sixth connections V5 and V6, only messages without useful data ND are exchanged between the communication unit KE and the SIP Proxy PCS. The second SIP Proxy SCS is always located in the home network HN of the communication unit KE and mainly has the function of a SIP registrar, see IETF RFC 3261, "SIP Initiation Protocol". The second SIP Proxy SCS has a tenth connection V10 to the database HSS. In order to also exchange SIP messages with one or more communication units KE in the public packet-oriented network PN, the second SIP Proxy SCS is connected by means of a ninth connection V9 to this public packet-oriented network PN.

With the aid of FIG. 5, the messages for exchanges for authentication and protection of integrity and for the distribution of one or more keys in accordance with this exemplary embodiment are explained in more detail. To use one or more IMS (IP Multimedia Subsystem) services, a communication unit KE first registers with the IMS network. The sequence of registration is described in detail in documents IETF RIF 3261 and 3GPP TS 24.229, version 5.2.0. "IP Multimedia Call Control Protocol based on SIP and SDP". Furthermore, examples of the message exchange are given in document 3GPP TS 24.228 "Signaling Flows for the IP Multimedia Call Control based on SIP and SDP"

2.2 Request Message

For registration, the communication unit KE first sends a request message AN named "Register" via the fifth and sixth connections V5 and V6 to the SIP Proxy PCS. This forwards this request message AN to the second SIP Proxy SCS in the home network HN by means of a second message N2. Both the request message AN and the second message N2 contain the user identity NID. The user identity NID used for authentication is, as described in documents IETF RFC 3310 and IETF RFC 2617, contained in the message AN or N2 in an information line with the name "Authorization".

2.3 Useful Information

On the basis of this user identity NID the second SIP Proxy SCS now, with the aid of a third message N3, requests one or more items of useful information NI from the database HSS. For further examination, a distinction is made between two different second keys SP2P and SP2N. The one second key is designated in the following as the second proxy key SP2P. This contains at least one key for authentication and protection of integrity and for encoding the connection between the communication unit KE and the SIP Proxy PCS, and is meant for the SIP Proxy PCS. The other second key is designated in the following as the second network key SP2N. This includes at least one key for protecting the integrity and for encoding the connection between the communication unit KE and the second network element NW2, and is meant for the second network element NW2. In the following, it is assumed that precisely one second network key SP2N and one second proxy key SP2P exist. After receipt of the third message N3, the database HSS answers with a fourth message N4 that contains one or more items of useful information NI. One or more items of useful information NI in this case include the second proxy key SP2P and the challenge HEF that is transmitted in a later step to the communication unit KE for authentication. The second SIP Proxy SCS now sends this useful information NI in a fifth message N5 with the name "401 Unauthorized" to the SIP Proxy PCS. This fifth message N5 contains both the second proxy key SP2P and also the challenge HEF, both of which are used for authentication of the communication unit KE between the communication unit KE and the second SIP Proxy SCS. The second proxy key SP2P and the challenge HEF are both, in accordance with documents IETF RFC 3310 and IETF RFC 2617, inserted into the fifth message N5 in an information line named "WWW-Authenticate". The SIP Proxy PCS takes the proxy key SP2P for protecting the integrity and for encoding from the fifth message N5 and forwards this modified message in the form of a sixth message N6 to the communication unit KE. On the basis of the information in the challenge HEF, the communication unit KE now generates a first key, designated in the following as a first proxy key SP1P, that is used to protect the integrity and for encoding. Furthermore, the communication unit KE uses the first proxy key SPIP to generate a response AGH to the challenge HEF.

2.4 Modified Request Message

Subsequently, the communication unit KE sends a modified request message ANM named "Register" to the SIP Proxy PCS. This modified request message ANM contains the response AGH to the challenge. In accordance with documents IETF RFC 3310 and IETF RFC 2617, this modified request message ANM contains this response AGH in an information line named "Authorization". Furthermore, the integrity of this modified request message ANM is protected with the aid of the generated first proxy key SP1P.

With the aid of the second proxy key SP2P, received from the second SIP Proxy SCS, the SIP Proxy PCS now checks whether the modified request message ANM was changed by the communication unit KE after its generation. If the check of the integrity shows that the integrity is in order, the SIP Proxy PCS forwards this modified request message ANM to the second SIP Proxy SCS in the form of an eighth message N8.

The second SIP Proxy SCS uses the response AGH to the challenge HEF to check whether the communication unit KE is authorized to register on the IMS network. If the check shows that the communication unit KE is authorized for this purpose, the second SIP Proxy SCS informs the database HSS, by means of a ninth message N9, that the communication unit KE is now registered.

2.5 Further Useful Information

The database HSS then sends one or more further items of useful information NIW, by means of a tenth message N10, to the second SIP Proxy SCS. One or more further items of useful information NIW include, for example, the second network key NP2N used to protect the integrity and for encoding for the connection between the communication unit KE and the second network element NW2. Furthermore, one or more filter instructions FW are contained, that are used to filter the message traffic from the second network element NW2. Alternatively, to transmit further useful information NIW by means of a tenth message N10, these further items of useful information NIW can already have been transmitted with one or more items of useful information NI in the fourth message N4. One or more filter instructions FW are generated in accordance with the previous exemplary embodiment.

In the next step, the second SIP Proxy SCS sends an eleventh message N11 with the name "200 OK" to the SIP Proxy PCS. This eleventh message N11 contains one or more second network keys SP2N for protecting the integrity and for encoding, that are used by the second network element NW2. Furthermore, this eleventh message N11 also contains additional information required by the communication unit KE, in order for it to calculate a first network key SP1N. A first network key SP1N and a second network key SP2N together form a correlated key pair SCP for protecting the connection between the second network element NW2 and the communication unit KE.

Alternatively, a common key pair SCP can be used instead of different keys for the particular connection between the communication unit KE and the second network element NW2 and between the communication unit KE and the SIP Proxy PCS.

2.6 User Identity

Several user identities NID can be allocated to one communication unit KE. In this case in an advantageous expansion, it is useful in practice to additionally allocate one or more user identities, with which the particular key may be used, to one or more keys. The second network element NW2 can permit the exchange of messages between the communication unit KE and the second network element NW2 by using a specific user identity, such as the first user identity NID1, or reject it under a different user identity, such as the first user identity NID2. The generation of different user profiles for one communication unit is thus possible.

The SIP Proxy PCS takes the second network key SP2N and all filter instructions FW from the eleventh message N11. Using the name "200 OK" of this eleventh message N11, the SIP Proxy PCS detects that the authentication was successful.

The SIP Proxy PCS sends this modified eleventh message N11 as the fourteenth message N14 to the communication unit KE. With the help of the information contained in this fourteenth message N14, the communication unit now calculates a first network key SP1N for protecting the integrity and for encoding. This first network key SP1N is used for message exchange between the communication unit KE and the second network element NW2. Furthermore, the SIP Proxy PCS uses a twelfth message N12 to forward its network key SP2N and all filter instructions FW to the second network element NW2, that confirms receipt by means of a thirteenth message N13.

2.7 Message Exchange

Figure 6:
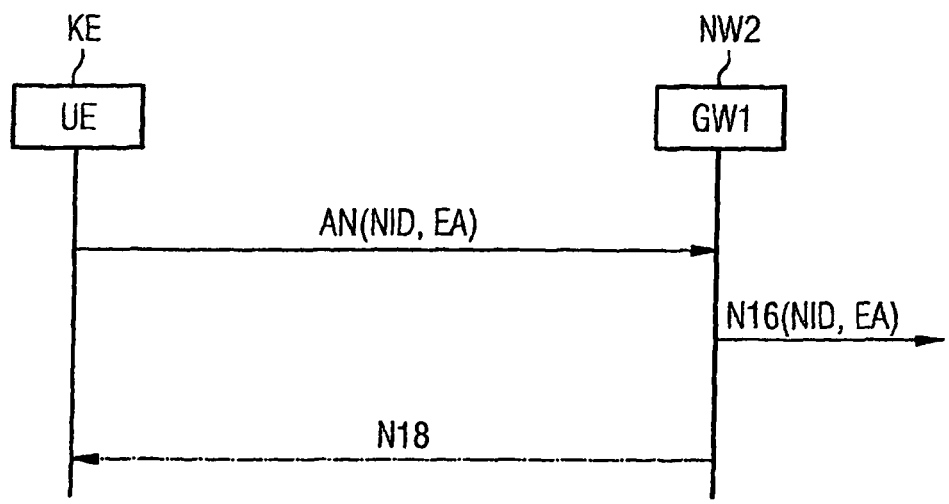
FIG. 6 A possible expansion of the flow diagram for an exemplary embodiment in accordance with FIG. 5.

In the following, the communication unit KE and the second network element NW2 can exchange messages with each other. This is explained in more detail with the aid of FIG. 6. The communication unit KE sends a request message AN to the second network element NW2. This request message AN contains the user identity NID and the required destination address EA from which useful data ND is requested. In the case where the HTTP protocol is used, this request message AN is an HTTP request. This request message AN is protected with the aid of a first network key SP1N to protect the integrity and can be encoded. With one of its network keys SP2N, the second network element NW2 is able to encode the received request message AN and to check whether this request message AN was changed by the communication unit KE after it had been generated. The second network element NW2 then checks whether the transmitted user identity NID can be used together with the used first network key SP1N or the corresponding second network key SP2N, and the communication unit KE is thus authorized to send one or more messages.

In a case where the communication unit KE is authorized to send one or more messages, the second network element NW2 also checks, with the aid of the filter instructions FW received from the SIP Proxy PCS, whether the communication unit KE can access the destination address EA contained in the request message AN by means of the user identity NID used by it. If this is the case, the second network element forwards this request message AN to the corresponding destination address EA in the form of a sixteenth message N16. Furthermore, the second network element NW2 checks whether it should generate one or more data records for the data volume for access to the required destination address EA. The generation of one or more data records in this case corresponds to the procedure described in the preceding exemplary embodiment.

In a case where the communication unit KE is not authorized under the named user identity NID to exchange messages with a second network element NW2 or under the named user identity NID is not permitted in accordance with one or more filter instructions FW to access the required destination address EA, the second network element NW2 sends back an eighteenth message N18 to the communication unit KE. This eighteenth message N18 notifies the communication unit KE that it is not authorized, under the named identity NID, to access the named destination address EA.

Finally, one or more data records can be transmitted via an eighth connection V8 to an evaluation unit AEW for evaluation.

3. Third Exemplary Embodiment—Association of Sip Signaling and Messages

In accordance with an expansion of the method in accordance with the invention, the following exemplary embodiment is used to describe how one or more messages with useful data ND between a communication unit KE and a second network element NW2 can be associated with a signaling transaction. For this purpose, it is assumed that the communication unit KE is already registered on the IMS network and thus the authorization has been successfully completed and also the corresponding key for protecting the integrity and encoding in the second network element NW2 and in the communication unit KE are present. The message flow for this exemplary embodiment is explained in more detail with the aid of FIG. 7. In addition to the network elements known from FIG. 4, a new network element named the application server AS is introduced for this exemplary embodiment. In this exemplary embodiment the application server AS is a presence server.

The purpose of the application server AS is to instruct the communication unit KE regarding the changing of an item of presence information of a further communication unit, possibly communication unit KE2. Where the SIP protocol is used for signaling, the application server AS in this case uses a SIP message with the name "Notify". In this case it is appropriate that the SIP message named "Notify" additionally contains the current presence information PI. If this presence information PI is very large, it is advantageous in practice if it is not transferred via the same connection as the other SIP messages, so that one or more SIP proxies, for example SIP proxy CPS or second SIP proxy SCS are not overloaded. A possible procedure for this is described in document "Draft-IETS-SIP-CONTENT-INDIRECT-MECH-00", "A mechanism for content indirection in SIP messages", see www.ietf.org, with which a communication unit is diverted to a destination address containing one or more items of useful data ND. This useful data ND corresponds in this embodiment to the current presence information PI. A diversion information UNI is contained in the SIP message for this purpose. This includes, for example, a diverted destination address UNI where this presence information PI is to be found. Furthermore, it indicates the protocol, for example HTTP, to be used to request this presence information PI.

First, the application server AS with the aid of a first message NI sends the diversion information UNI to the second SIP Proxy SCS, that also indicates that presence information PI of a second communication KE2 is available at a diverted destination address UEA. This presence information PI is meant for the communication unit KE. The second SIP Proxy SCS expands this first message NI by adding an acquisition identity EI. The acquisition identity EI clearly identifies a SIP transaction, i.e. in this case the notification of the communication unit KE regarding the presence information PI of the second communication unit KE2. It is possible to signal this acquisition identity EI with the aid of an information line with the name "Media-Authorization" (see IETF RFC 3310) in a message. This acquisition identity EI indicates that those messages are to be separately acquired that are to be exchanged between the communication unit KE and the second network element NW2 on the basis of the diversion information UNI contained in this first message NI.

In a next step, the second SIP Proxy SCS sends this expanded message in the form of a second message N2 to the SIP Proxy PCS. This second message N2 contains the diversion information UNI and the acquisition identity EI. Furthermore, the second SIP Proxy SCS can also specify the number of permitted accesses and/or the time duration in which the accesses to the diverted destination address UEA are permitted. Furthermore, the second SIP Proxy SCS generates a data record DS that can subsequently be used for controlling and evaluating the message traffic. This data record DS preferably contains the following data record elements:

Type of message from the application server AS, for example type "Notify" or "Info" SIP message;
Diverted destination address UEA to which reference was made in the particular message;
Acquisition identity EI;
User identity NID.

As an alternative, a data record DS can already be generated and the acquisition identity EI created by the application server AS instead of the second SIP Proxy SCS.

The SIP Proxy PCS forwards the second message N2 in the form of a third message N3 to the communication unit KE. In parallel with this, the SIP Proxy PCS sends a fourth message N4 to the second network element NW2. This fourth message N4 informs the second network element NW2 that it is to separately acquire the message traffic with the communication unit KE, if the acquisition identity EI is contained in the messages of the communication unit KE. The acquisition identity EI and the diverted destination address UEA that can be accessed by means of this acquisition identity EI are contained in the fourth message N4 for this purpose. This is advantageous in practice because the second network element NW2 thus has the capability of using this acquisition identity EI to stop messages to destination addresses other than the diverted destination address UEA. Furthermore, the user identity NID with which the communication unit KE can send messages with this acquisition identity EI is also contained in the fourth message N4.

Furthermore, this fourth message N4 can contain repetition information that indicates how often the communication unit KE may use the acquisition identity EI. If messages on the connection between the communication unit KE and the second network element NW2 are lost, this repetition information can be used to indicate how often the communication unit KE can repeatedly send this message. A multiple transmission of a specific message with the same acquisition identity EI is thus enabled. However, the possibility of a communication unit KE using the same acquisition identity EI for additional messages is limited. This repetition information can also be already transmitted from the second SIP Proxy SCS to the SIP Proxy PCS in the second message N2.

The SIP Proxy PCS and the second network element NW2 are always located in the same network, for example in FIG. 4 in the visited network VN. Meanwhile, when "roaming" the second SIP Proxy SCS can be in a different network than the communication unit, for example in FIG. 4 in the home network HN. Therefore, the SIP Proxy PCS knows which type of connection, for example lossy or lossless, is supported and used by the second network element NW2.

The second network element NW2 now confirms receipt of the fourth message N4 by means of a fifth message N5. The communication unit KE confirms receipt of the third message N3 by using a sixth message N6. After receipt of this sixth message N6, the SIP Proxy PCS forwards this message in the form of a seventh message N7 to the second SIP Proxy SCS, that then forwards this seventh message N7 in the form of an eighth message N8 to the application server AS. In this way, the application server AS knows that the communication unit KE has received diversion information UNI.

Subsequently, the communication unit KE sends a request message AN to the second network element NW2, in order to request one or more items of useful data ND from the diverted destination address UEA given in the third message N3. If the HTTP protocol is used for the request message AN, this is an HTTP request. This includes both the diverted destination address UEA and the user identity NID. This user identity NID is contained in the information line with the name "Authorization" in this request message AN, as described in IETF RFC 3310 and IETF RFC 2617. In addition, the acquisition identity EI is integrated into this request message AN.

In a possible expansion of the exemplary embodiment in which the HTTP protocol is used for the request message AN, this acquisition identity EI can be contained in an information line, to be redefined with the name "Access Authorization".

The second network element NW2 uses the information received from the SIP Proxy PCS to check whether the communication unit KE is authorized under the user identity NID contained in the request message AN to access the given diverted destination address UEA by specifying the acquisition identity EI. If the check shows that access is permitted, the second network element NW2 forwards this access message AN to the diverted destination address UEA. This takes place in the form of a tenth message N10. Furthermore the second network element now separately acquires the message exchange on the basis of this request message AN. For this purpose, the second network element creates a second data record DS2 that advantageously contains the following data record elements:

Acquisition identity EI;
Diverted destination address UEA which the communication unit KE accesses;
User identity NID;
Size of all messages;
Number of messages that were exchanged under the acquisition identity EI.

The answer to the tenth message N10 is sent to the second network element NW2 by means of an eleventh message 11. This eleventh message N11 is acquired in the second data record DS2 and then forwarded to the communication unit KE in the form of a twelfth message N12.

In the case where the communication unit KE was not authorized to send the request message AN to the second network element NW2, the second network element NW2 sends back a thirteenth message N13 to the communication unit KE. This thirteenth message N13 states that the request message AN was not forwarded. In this case, the tenth, eleventh and twelfth messages N10, N11 and N12 are not sent.

3.1 Evaluations of Data Records

In a next step, the second network element NW2 can send this second data record DS2 to an evaluation unit AWE, for example a call-charging center, for evaluation and controlling. In addition, the data record DS can also be forwarded to the evaluation unit AWE.

With the help of both data records DS and DS2, the evaluation unit AWE can now correlate the messages with signaling information, thus for example the SIP transactions, and the messages between the communication unit KE and the second network element NW2. The acquisition identity EI in this case identifies the particular messages that were generated on the basis of a specific SIP transaction. This is advantageous in practice because those messages between the communication unit KE and the second network element NW2, that have been triggered by SIP signaling, can be evaluated differently, e.g. charged, from the other message traffic. For example, messages with useful data ND that contain images or Internet pages can be charged at a higher tariff than those messages that were generated by the SIP signaling. In addition, an evaluation criterion can be derived relative to the data volume of the transmitted messages. For example where a larger quantity of data is transmitted the price for each unit of transmitted data is more favorable. Besides this, an evaluation criterion using accesses to specific destination addresses can be generated. Thus, for example, chargeable call services can be allocated to certain destination addresses, e.g. requesting a telephone number from an Internet-based telephone information service. Accesses to these specific destination addresses are billed at a special rate on the basis of this selection criterion.

In addition, repeated accesses to a destination address can be evaluated differently. The initial access to a certain destination address may possibly be free of charge, whereas each further access incurs a charge. In practice, it can also be useful to make the analysis of the transmitted messages relative to the transmitted user identity NID. A certain user identity ID can, for example, be allocated to a specific application AP that can be used free of charge.

In addition to the evaluation of one or more data records for the purpose of billing a communication unit, the evaluation unit AWE can also control and/or optimize the message traffic within one or more networks. For example, destination address of a data server that contains useful data to which frequent accesses are made and which cause a large amount of data to be transferred can thus be filtered out. In a further step, this useful data can possibly be copied to several data servers in different networks, in order to improve the distribution of the transmitted data volume.

We claim:

1. A method for controlling and evaluating message traffic of a communication unit, which comprises the steps of: transmitting all messages of the message traffic via a first network unit within a mobile radio system, the first network unit deciding, with an aid of at least one item of useful information of the communication unit, whether one or more of the messages transmitted from the communication unit are to be forwarded to a second network unit for further processing, or are to be blocked; determining, via the first network unit with the aid of at least one item of the useful information assigned to the communication unit, whether a particular message of the message traffic is to be logged in a logfile by the first network unit; allocating at least one user identity to the communication unit; assigning each one of the at least one user identity with a specific set of the useful information, with the specific set of the useful information being used to control and evaluate at least one message transmitted from the communication unit or the message traffic of the communication unit to be logged; and allocating each of the at least one user identity to a respective one of a plurality of applications of the communication unit, and logging the message traffic at an application level in dependence on a content of individual messages of the message traffic, wherein the content of a first one of the individual messages of the message traffic is multimedia content, the content of a second one of the individual messages is control information, and the logging step includes logging the first one of the individual messages and excluding the second one of the individual messages from the logging.

2. The method according to claim 1, which further comprises calling up the at least one item of the useful information that determines the controlling and evaluation of the at least one message of the message traffic of the communication unit from a database.

3. The method according to claim 1, which further comprises inserting at least one filter instruction into the at least one item of the useful information and selecting the filter instruction from the group consisting of:
   one or more positive destination addresses that are addressable for the communication unit;
   one or more negative destination addresses that are not addressable for the communication unit; and
   one or more destination addresses that are to be logged by the first network unit.

4. The method according to claim 1, which further comprises identifying the messages of the traffic message to be logged with an acquisition identity.

5. The method according to claim 1, which further comprises forwarding the logfile via the first network unit using a logging message to an evaluation unit for evaluation.

6. The method according to claim 5, which further comprise evaluating the messages logged in the logfile via the evaluation unit using at least one criteria selected from the group consisting of:
   useful data of the message;
   destination address of the message;
   number of accesses to the destination address;
   data quantity;
   the messages that were sent with a specific user identity;
   the messages that were sent with a specific acquisition identity; and
   correlation of messages with signaling information and/or the useful data.

7. The method according to claim 1, which further comprises:
   authorizing the communication unit to exchange messages; and
   using at least one key pair to provide a protected message traffic.

8. The method according to claim 1, which further comprises using the method in an architecture in accordance with an IP multimedia subsystem with an aid of a session initiation protocol.

9. The method according to claim 1, which further comprises forming the first network unit as a group of network elements.

10. The method according to claim 1, wherein the useful information includes a destination address.

11. The method according to claim 1, which further comprises registering the first one of the individual messages as a chargeable data volume during the logging.

12. A first network unit for controlling and evaluating message traffic of a communication unit within a mobile radio system, the first network unit comprising: a receiving unit for receiving all messages of the message traffic transmitted from the communication unit; a transmitting unit for transmitting the messages of the message traffic; and a processing unit for deciding whether at least one of the messages of the message traffic can, on a basis of at least one item of useful information of the communication unit, be forwarded to a second network unit for further processing or can be blocked; said processing unit further deciding whether at least one of the messages of the message traffic can, on a basis of at least one item of the useful information assigned to the communication unit, be logged by the first network unit in a logfile, with at least one user identity being assigned to the communication unit, with each one of the at least one user identity being assigned to a specific set of the useful information, with the specific set of useful information being used to control and evaluate at least one of the messages transmitted from the communication unit or the message traffic of the communication unit to be logged, with each one of the at least one user identity being allocated to a respective one of a plurality of applications of the communication unit, and with each one of the plurality of applications of the communication unit being logged; said processing unit configured for logging the message traffic at an application level in dependence on a content of the individual messages of the message traffic, said processing unit configured for logging a first one of the individual messages having multimedia content as the content thereof and said processing unit configured for excluding from the logging a second one of the individual messages having control information as the content thereof.

13. The first network unit according to claim 12, wherein the useful information includes a destination address.

14. The first network unit according to claim 12, wherein said processing unit is configured for registering the first one of the individual messages as a chargeable data volume during the logging.

* * * * *